United States Patent [19]

Coiner

[11] Patent Number: 5,364,142
[45] Date of Patent: Nov. 15, 1994

[54] HEAVY DUTY VEHICLE BUMPER WITH STORAGE COMPARTMENT AND ACCESSORIES

[76] Inventor: Robert A. Coiner, 2620 Paul Bunyan Dr. SE., Bemidji, Minn. 56601

[21] Appl. No.: 92,777

[22] Filed: Jul. 19, 1993

[51] Int. Cl.⁵ .......................................... B60R 19/48
[52] U.S. Cl. .................................. 293/117; 293/106; 293/115
[58] Field of Search ...................... 293/106, 117, 115

[56] References Cited

U.S. PATENT DOCUMENTS

| | | | |
|---|---|---|---|
| 2,231,312 | 2/1941 | Ache | 293/117 X |
| 2,231,313 | 2/1941 | Ache | 293/117 |
| 2,649,308 | 8/1953 | Bice, Jr. | 293/117 X |
| 2,993,721 | 7/1961 | Bowman | 293/106 |
| 3,471,070 | 10/1969 | Olson | 293/106 X |
| 3,501,170 | 3/1970 | DaValle | 293/106 |
| 3,606,385 | 9/1971 | Johannes | 293/106 X |
| 3,614,136 | 10/1971 | Dent | 293/106 X |
| 3,639,748 | 1/1972 | Pearson et al. | 362/82 |
| 4,099,760 | 7/1978 | Mascotte et al. | 293/117 X |
| 4,127,295 | 11/1978 | Robinson | 293/106 X |
| 4,138,152 | 2/1979 | Prue | 293/117 |
| 4,570,986 | 2/1986 | Sams | 293/117 |
| 4,634,163 | 1/1987 | Bundy | 293/117 |
| 4,674,782 | 6/1987 | Helber | 293/106 |
| 4,893,856 | 1/1990 | Council | 293/106 |
| 4,901,895 | 2/1990 | Gancarz | 293/117 X |
| 4,950,010 | 8/1990 | Denny | 293/117 |
| 4,993,610 | 2/1991 | Abretski et al. | 293/106 |
| 5,016,932 | 5/1991 | Carter | 293/106 |
| 5,139,296 | 8/1992 | Bundy | 293/117 |

FOREIGN PATENT DOCUMENTS 518396  7/1976  U.S.S.R. ................. 293/106

Primary Examiner—Joseph Pape
Attorney, Agent, or Firm—Haugen and Nikolai

[57] ABSTRACT

A heavy duty, protective storage bumper (10) mounted to the front or rear of full size and compact pick up tracks, vans and 4 wheel drive vehicles (80) or to the front of semi tractors (90) and other heavy equipment vehicles, providing protection for the vehicle and containing an enclosed compartment used for the storage of tools and emergency road or field equipment. A bumper assembly (10) with a storage compartment consisting of outer (18), inner (14), and bottom walls (16). Side walls (26) extend and angle outward to form protective side panels (30), which cradle and protect the corners of the vehicle's quarter panels (82). A lid is constructed with skid resistant strips (38) on the upper surface and weather seal (58) on the under surface. The lid is mounted to the inner lip (24) of the storage compartment with pin-in-pipe hinges (12) and is latched with lockable latches (44). Receptacles for lights (48) electrical outlet (46), trailer hitch (60), and winch (62) are recessed into the outer wall (18) of the compartment. A license plate bracket (54) is attached to or recessed into the outside of the outer wall (18). Optional tow hooks (56) are attached to the underside of the compartment bottom wall (16) or recessed into the outer wall (18). Optional brush guard (64) is attached to the lid on front bumpers.

8 Claims, 3 Drawing Sheets

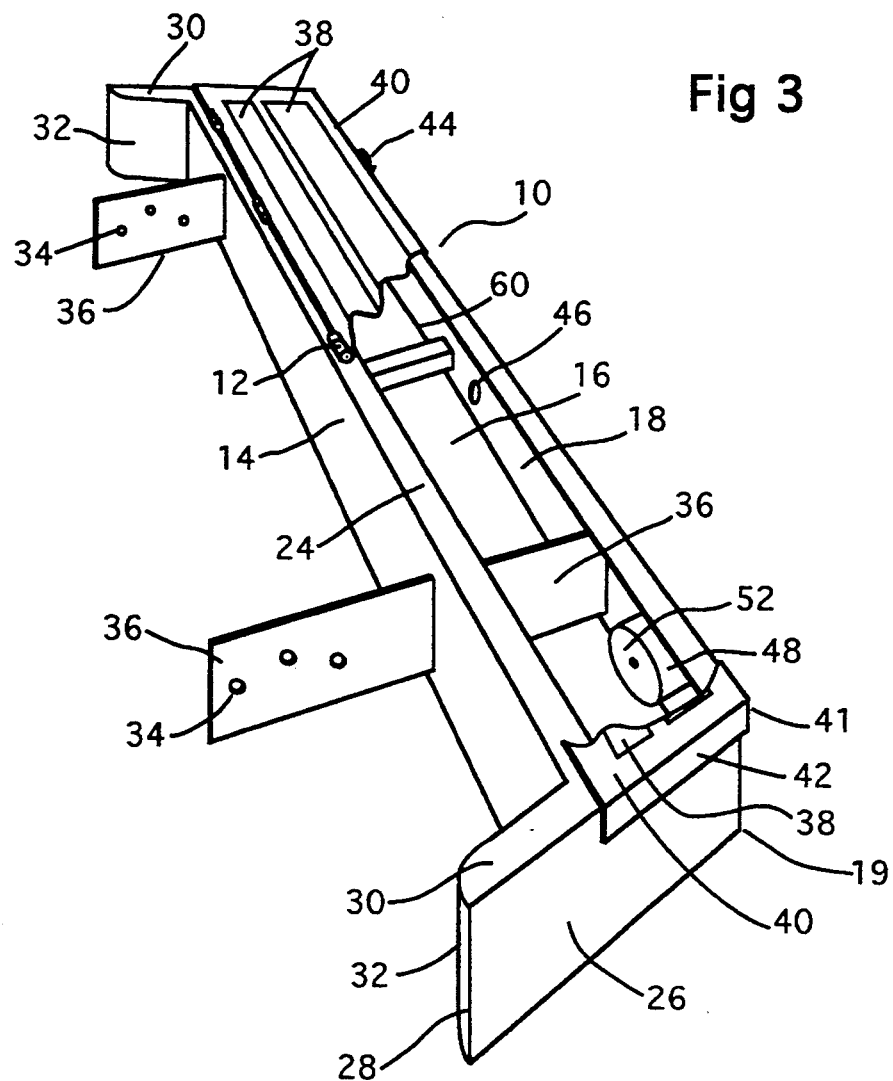
Fig 3
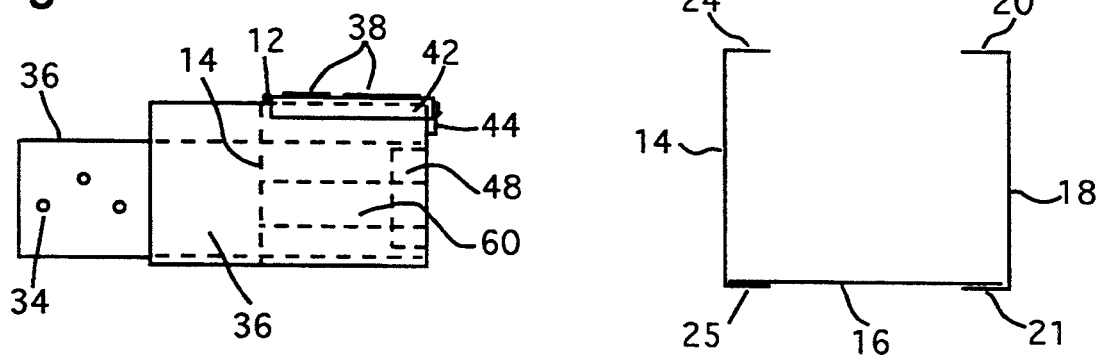
Fig 4
FIG 5

HEAVY DUTY VEHICLE BUMPER WITH STORAGE COMPARTMENT AND ACCESSORIES

FIELD OF THE INVENTION

This invention relates to a heavy duty storage bumper assembly to be mounted either at the rear or the front of pick up trucks, RVs, 4 wheel drive utility vehicles, and at the front of Semi Tractors or heavy equipment vehicles, to provide storage space for tools, emergency equipment and other items and to add safety and protection to the vehicle.

BACKGROUND OF THE INVENTION

The purpose of most bumpers on the market is to provide protection for the vehicle and its occupants in case of collision, to provide a finished "dress" appearance and to be used for towing purposes. However, most bumpers available today are ornamental in nature, and built of such light weight materials that low speed impacts will dent or bend the bumper and possibly also damage the vehicle. When used for towing purposes, these light weight bumpers often cannot withstand heavy loads without bending or pulling apart and often damaging the vehicle. Furthermore, light weight truck bumpers are often built of such light weight material thereby causing a motorist to observe noticeable vibration of the rear panel of the bumper on a passing truck.

It is an object of the present invention through sturdiness of design and the use of durable, long lasting materials to produce a bumper that will not only withstand hard use and heavy loads without damage, but be inexpensive to manufacture and comparable in price to conventional bumpers.

A safety feature of this bumper is the protective side panels which wrap at an angle around the corners of the quarter panels to provide added support to the bumper and protection for the vehicle. A problem with the side panel design of U.S. Pat. No. 3,471,070 is that it extended to far forward and wrapped snugly along the side of the quarter panels thereby causing excessive damage with a buckling effect to the quarter panels, upon bumper impact. The present inventor, as an individual skilled in auto body repair, has repaired a number of such cases. The side panels of the present invention would not have this problem since the side panels are sturdier, of shorter length, and angle in an outward direction away from the quarter panels. Thus, impact with the bumper would be distributed to the vehicle frame and not to the quarter panel surface.

In addition to the protection and safety functions, the primary object of this invention is to provide the added feature of a large compartment used to provide secure storage of tools, jack, tow rope, chains, flares etc. in a lockable storage compartment. When using vehicles with conventional non-storage bumpers, tools or other equipment are often found buried in the front of the pick up bed under an assortment of debris when needed, or stored behind or under the driver's seat or in a tool box that takes up needed space in the vehicle. The present invention would keep these articles out of the elements, safe from theft, and in a convenient and easily accessible place in case of emergency or need.

A hinged lid is designed to cover and protect the storage compartment and its contents, add durability and strength to the bumper as well as lockable means for security of the stored items. The lid will have non-skid strips (38) adhered to the upper surface to prevent slippage if the bumper is used as a step means. A strip of weather seal will adhere to the underside of the cover to keep the compartment dry and weather resistant.

Another object of the invention is provide receptacles comprising of auxiliary lights, electrical outlet, and trailer hitch receivers, with the addition of a license plate bracket, and tow hooks. Most conventional bumpers provide only for receiving a license plate and all other accessories must be added on in some manner by the owner. Additional features for front bumpers will comprise of a winch receiver, optional tow hooks and a brush guard. The brush guard will serve as protection for the radiator, grill and paint surface, and be an optional addition to the front bumper for pick up trucks and 4×4 utility vehicles.

Storage bumpers in prior art such as U.S. Pat. No. 4,674,782 use piano hinges which would be difficult to keep clean and functioning in adverse conditions, or barn door type hinges used in U.S. Pat. Nos. 4,570,986 and 3,614,136, which are awkward and unattractive in appearance and lack the necessary strength needed for securing and operating a heavy duty lid. The hinges used in the present invention are of a pin-in-pipe type hinge that is welded to the lid and inner lip. The hinges pivot easily and allow for removal of the lid for easier access to the compartment and for cleaning purposes.

An added object of the present invention is to provide a heavy duty bumper that will be not only functional and sturdy, but also attractive in appearance. The present bumper is designed with simple, yet attractive lines that compliment the vehicle and do not look "added on" or clumsy. The present bumper will be available in either a primered, chromed finish or painted to match the color of the vehicle.

A further object of the present invention is to offer consumers an alternative choice as a replacement bumper for used vehicles or as an original bumper on a new vehicle. Some vehicles (especially ¾ and 1 ton pick ups) come without factory installed bumpers.

SUMMARY OF THE INVENTION

The present bumper invention has a storage compartment which extends in a horizontal plane across the front or rear of a variety of vehicles. The size of the storage compartment is dependent on the vehicle the bumper is being mounted on, with a rear bumper having a larger storage compartment than a front bumper. Heavy gauge steel will be used in the manufacturing for the purpose of preserving vehicle and bumper under adverse conditions. Heavy work vehicle bumpers may incorporate ¼" channel iron and heavy sheet metal of at least about 10 to 2 gauge steel, while lighter gauge sheet steel will achieve the advantages of the invention for dress and utility bumpers. The surfaces will be coated in either a primered, painted or chromed finish.

A more complete description of the present invention, including many of the features and various novel details will become more apparent by way of illustration in the accompanying drawings. It is to be understood that the scope of the invention should not be limited only to the features and details shown in the drawings, but that the principles and features illustrated and described are rather an exemplification of one preferred embodiment thereof.

DESCRIPTION OF THE DRAWINGS

A clearer understanding of the presently preferred embodiments, objects and advantages of the invention will become more apparent through the following drawings.

FIG. 3 is an elevational perspective view with a portion cut away to show the inside portion or the compartment.

FIG. 4 is a side elevational view of the previous figures.

FIG. 5 is a side view of compartment wall construction.

DETAILED DESCRIPTION

Figure 1:
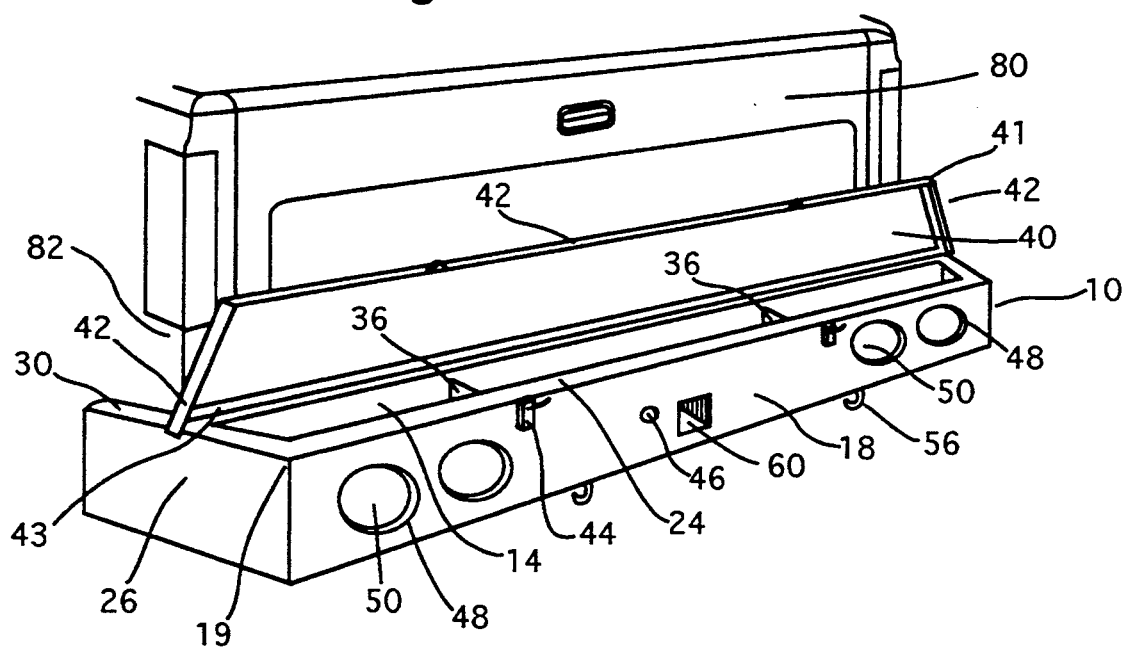
FIG. 1 is a perspective view of the preferred embodiment of the invention.
Figure 2:
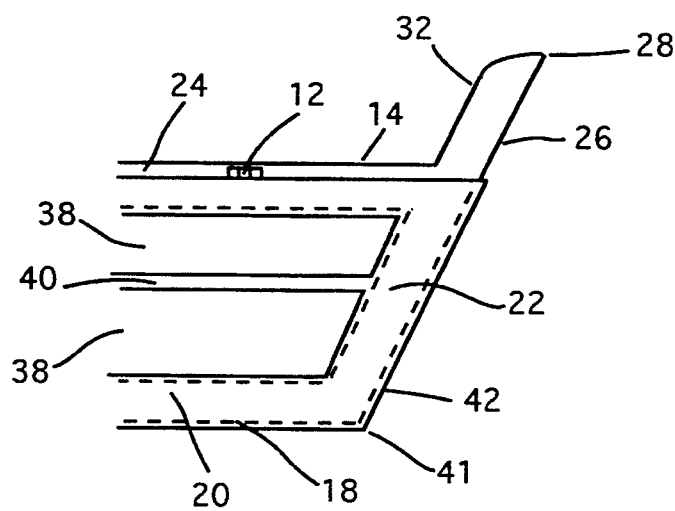
FIG. 2 is a fragmentary plan view showing a portion of the assembly of FIG. 1 enlarged for clarity.

FIGS. 1 to 5 illustrate a storage bumper assembly (10), designed primarily as a rear automotive vehicle bumper, but one which can also function as a front bumper assembly. Referring now more particularly to FIG. 1, bumper assembly (10) is shown with the lid (40) hinged in an open position and mounted to the vehicle (80) by means of brackets (36). Heavy duty work vehicle bumpers can be built of either heavy duty sheet metal or with a combination of channel iron and heavy duty sheet metal. The two methods of construction are described as follows with particular reference to FIGS. 2 to 5.

With the combination of channel iron and sheet metal method of construction, shown in FIG. 5 spaced, inward facing channel irons form the outer (18) and inner (14) walls of the body. Outer wall (18) has notches cut in the upper (20) and lower lips (21) of the channel iron to allow it to be bent at an angle to form the corners (19) and the side walls (30) of the compartment. A second (separate) piece of channel iron is cut to fit up to and inside side walls (26) to form the inner side wall (32) of the storage compartment (10). A bottom wall (16) of sheet metal is welded to the inside of the bottom portion of the inner (25) and outer (21) bottom lips of the channel iron as shown in FIG. 5. Bottom wall (16) is then caulked to provide weather proofing.

Referring now more particularly to FIG. 3, for lighter vehicles or loads, the storage compartment (10) is made primarily of heavy duty sheet metal of about 10 gauge weight. An elongate strip of sheet metal is bent on both narrow sides to form upper outer lip (20), outer wall (18) and bottom outer lip (25). Notches are cut toward the outer ends of said strip of sheet metal, as described in the previous method, to form corners (19) and side walls (30). A second elongate piece of sheet metal is bent to form upper lip (24), inner wall (14), and bottom wall (16) of storage compartment (10). The bottom wall (16) of the second strip of bent sheet metal is fitted inside lower lip (21) of the first strip of sheet metal and welded together along the joint of the two strips of elongate sheet metal to form the bottom wall (16) of the compartment (10). A compartment (10) is thus formed with outer (18), inner (14), bottom and side (26) walls and with a lip (20 and 24) encompassing the top surface of the compartment. Drain holes are drilled in the bottom wall for cleaning purposes. Plastic plugs will seal the drain holes to insure a weather proofed compartment.

To construct enclosed inner side walls (32), a snip of sheet metal is welded to the end of side panel (28), bent around the curve and welded in place to forth and enclose the inner wall (32) of protective side panel (30).

Bracket plates (36) for the purpose of mounting the bumper assembly (10) to the vehicle (80) are of elongate ¼" steel and are welded at a 90 degree angle to the inside of outer wall (18) thereby attaching the narrow side of the elongate piece of steel in a vertical position to the outer wall (18). Bracket (36) extends through the inner wall (14) to the vehicle body (80) where a plurality of holes (34) are drilled at designated places in bracket (36). Bracket (36) is mounted to vehicle (80) frame by means of bolts utilizing bracket holes (34). The method of attachment may vary depending upon the vehicle model and year.

To construct lid (40), an elongate piece of sheet metal is utilized with notches cut on both narrow sides of the sheet metal toward either end, to allow for the formation of lid corners (41). The sheet metal edges are then bent at right angles to form lid edges (42) that will fit over storage compartment (10) to form an enclosure. The corners (41) of lid edges (42) are then welded and the lid (40) is attached to the inner lip (24) of storage compartment with hinges (12).

Lid (40) is attached either by a slide-in-slot or by a pin-in-pipe hinge (12) attachment system welded to the top side of inner lip (24). Lid system will be equipped with lockable latches (44) which may be welded in place to either the outer wall (18) and/or side walls (26) and to the lid edge (42). Other attachment and release mechanisms may be employed providing they allow ease of maintenance and pivotal action.

Skid resistant strips (38) adhere to the upper surface of lid (40) to help prevent slippage whenever the bumper is being utilized as a step means. A strip of weather seal (43) (FIG. 1) will adhere around all four edges of lid (40) underside to keep the compartment dry and weather resistant.

Referring more particularly to FIG. 1, rear bumper storage compartment (10) will include back up and tail lights (50). Light receptacles (48) to house these lights are recessed at designated areas into the outermost wall (18) of storage compartment (10). Receptacles (48) are built from a short section of steel tubing with a circular piece of sheet metal welded to one of the open ends to enclose one end of steel tubing. Holes the same diameter as steel tubing are cut into outer wall (18) of compartment (10) and the enclosed steel tubing (48) is inserted into the circular hole and welded in place to form a lamp housing or light receptacle (48). Receptacle (48) will have a hole drilled in the rear panel (52) for an outlet for electrical connections. Said connections and attachment devices will be accessible from inside the compartment as well.

Storage compartment (10) will have a built in square tubing trailer hitch receiver (60) to accept and lock in industry standard trailer hitch means. The hitch receiver (60) will be welded into outer wall (18) of compartment (10) in the same manner as the light receptacles (48), except that a square hole must be cut to accept the square tubing. Hitch receiver is welded to the square hole cut in outer wall (18) and to the inside of the inner wall (14) of compartment (10). When not in use, the receiver mechanism compartment will be covered by a compatible plastic snap-on cover. Tow hooks (56) will be mounted to the bottom of the bumper as an optional accessory.

Figure 6:
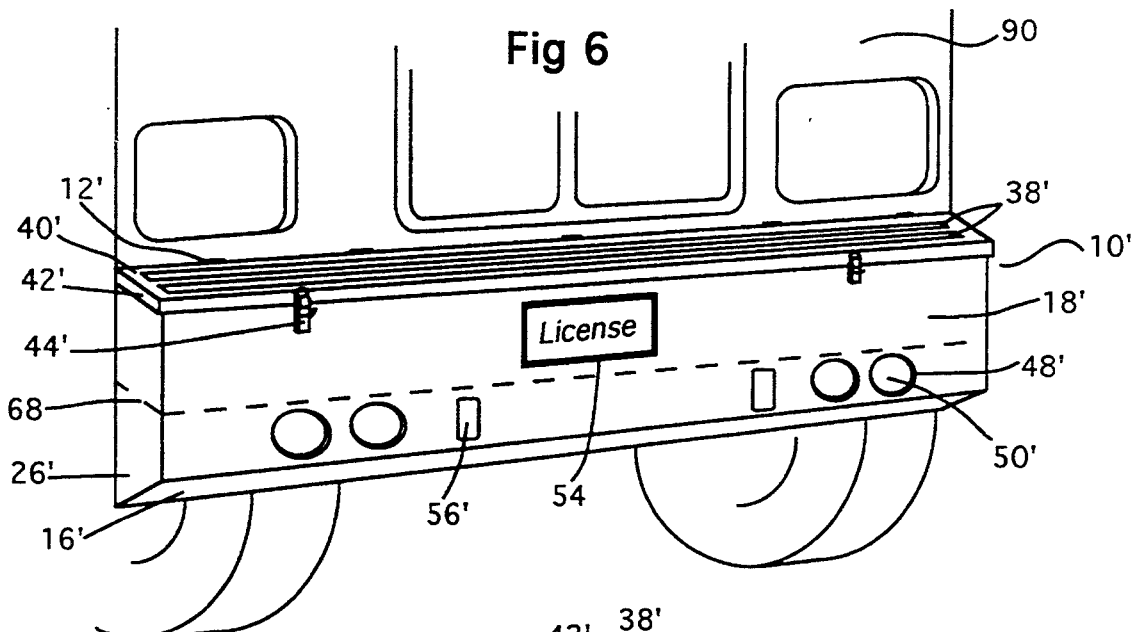
FIG. 6 is a perspective view of an additional embodiment.
Figure 7:
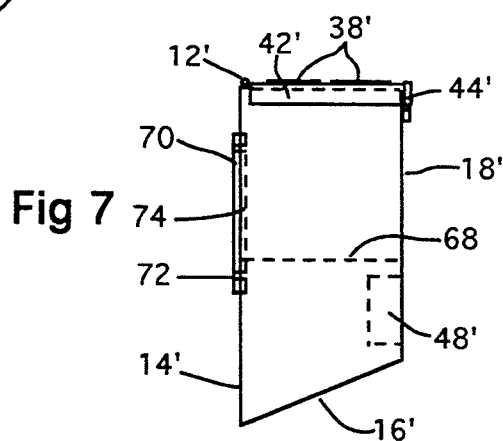
FIG. 7 is a side plan view of the previous embodiment.

Referring now to FIGS. 6 and 7, which pertain to an additional embodiment of the storage bumper assembly (10'), a storage bumper assembly for semi tractors (90) or heavy equipment vehicles. Construction of the semi tractor bumper assembly (10') is similar to FIG. 1 with several exceptions. Bumper assembly (10') outer wall (18') is notched and bent at a 90 degree angle and joined with inner wall (14') where it is welded to form side walls (26'). Driving light receptacles (48') and tow hooks (56') are recessed into the lower portion of outer wall (18'). An intermediate bottom wall (68) is welded to inner (14'), outer (18') and side (26') walls, forming the storage compartment floor (68). A License plate bracket (54) is welded to the outer wall (18'). Brackets for attachment of the bumper assembly (10') to vehicle (90) are the same as FIG. 1 for conventional semi tractors. FIG. 7 illustrates the bracket means for cab over semi tractors. Elongate sheet metal support plates (70 and 74) are welded to the inside and outside of the inner wall (14') of the storage compartment to add strength and support to the bumper assembly (10'). A plurality of holes (72) are drilled through the support plates (70 and 74) and the inner wall (14') for bolting bumper assembly (10') to the vehicle frame (90).

Figure 8:
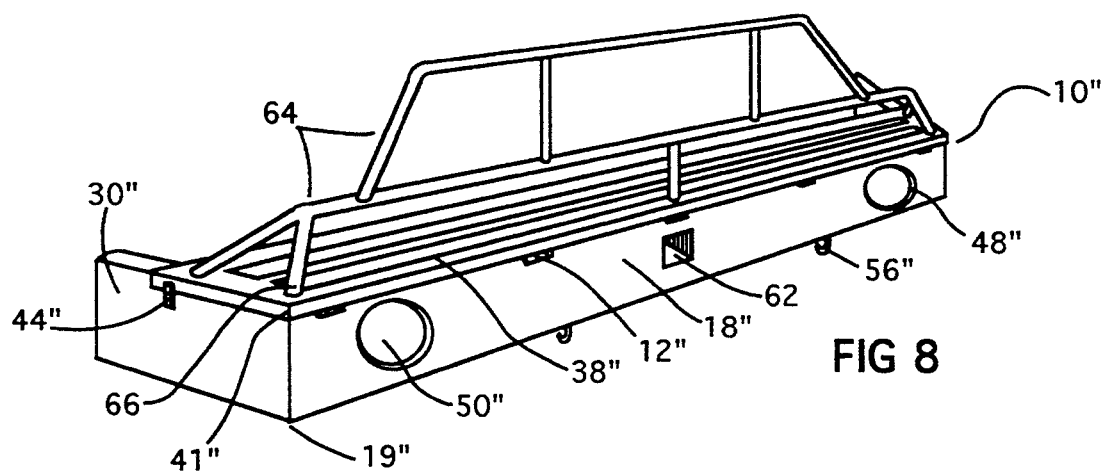
FIG. 8 is a perspective view similar to FIG. 1, but of an additional embodiment.

Referring specifically to FIG. 8, driving light receptacles (48") will be recessed into the outer wall (18") of a front bumper in the same manner as backup and tail light receptacles (48) in FIG. 1. Tow hooks (56") are an optional accessory and will be either recessed into the outer wall (18") or mounted to the underside of the bottom wall (16"). Front bumper lid (40") is attached to the outer lip (20") and latched on the inner lip (24").

A brush guard (64) is an optional accessory, constructed of either flat or tube steel and mounted to the outer corners of lid (4-") by bolting means. A piece of flat stock or nut is inserted into the open ends (66) of each piece of brush guard tubing and welded in place in order to accept a threaded piece of round stock or bolt. Said bolts are inserted from the underside of the lid (40") through a plurality of holes in the lid surface and are threaded into ends (66) of brush guard tubing and tightened securely into place. When brush guard (64) is removed, the resulting bolt holes in lid surface will be closed by means of plastic plugs. The presently preferred embodiment of brush guard (64) extends the full horizontal length of the front bumper, surrounds the vehicle headlamps and extends vertically to the top of the vehicle hood. To open lid with brush guard attached, the upper portion of brush guard (64) is pulled toward the person in a downward direction. Other variations of brush guard combinations are possible and may be employed in various embodiments without departing from the scope of the invention.

Although the description above contains many specificities, these should not be construed as limiting the scope of the invention, but as merely providing illustrations of some of the presently preferred embodiments of this invention. Many other variations are possible and may be employed in various and numerous embodiments without departing from the scope of the invention.

What I claim is:

1. A heavy duty protective vehicle bumper suitable for attachment to the front or rear of a vehicle comprising:
   (a) an elongated storage compartment having aligned transverse sidewalls formed by spaced oppositely disposed structural inner and outer sidewall members having inward facing upper and lower flanges, endwalls formed by oppositely disposed structural endwall members having inward facing upper and lower flanges forming end closures spanning said sidewalls members, and a bottom plate member spanning the lower flanges of the structural sidewall and endwall members and thereby defining a storage compartment volume;
   (b) lid means hinged to the top flange of one of said sidewall members and forming a top closure for said storage compartment;
   (c) a pair of wrap-around extensions formed by said endwall structural members extending beyond the inner sidewall member in a direction along the body of said vehicle at a slight outwardly directed angle and wherein each said extension further comprises a sidewall member joining the inward directed flanges of said extension of said endwall structural members to provide a box structure; and
   (d) a plurality of attachment means for securing the bumper to a vehicle frame.

2. The apparatus of claim 1 wherein the sidewall and endwall structural members are channel members.

3. The apparatus of claim 1 wherein said sidewall and endwall shapes and bottom plate members are constructed from heavy gauge sheet metal.

4. The apparatus of claim 2 further comprising pin-in-pipe hinge means pivotally fixing said lid to said top flange.

5. The apparatus of claim 1 further comprising a plurality of recessed lamp receptacles for containing illumination devices in said outer sidewall said receptacles further being accessible from within said compartment.

6. The apparatus of claim 1 wherein said lid means has an outer surface and further comprising skid resistant material adhered to said outer surface to prevent slippage if said lid be utilized as a step means.

7. The apparatus of claim 1 further comprising one or more stiffener members spanning said spaced inner and outer sidewall members intermediate said endwall members.

8. The apparatus of claim 1 wherein said extensions comprise a pair of juxtaposed inward facing channel members.

* * * * *